M. VERGNES.
VOLTAIC GAS BATTERY.
No. 28,317. Patented May 15, 1860.
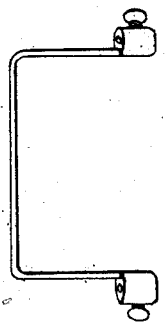
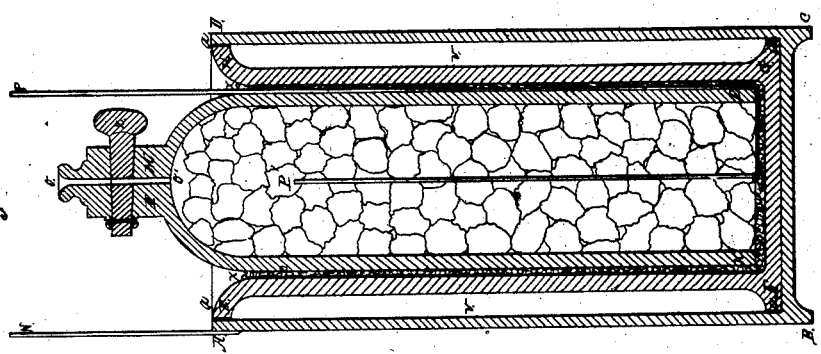
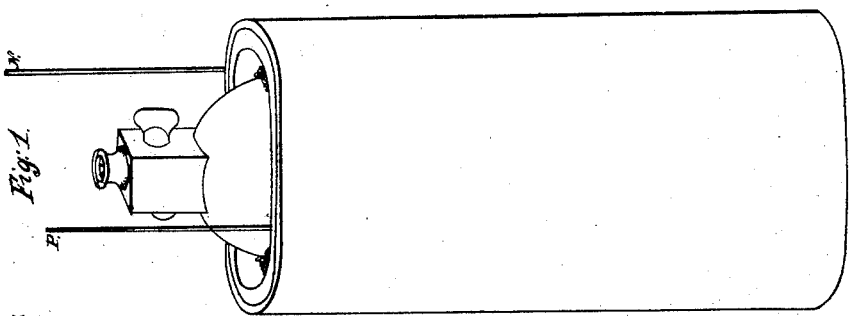

UNITED STATES PATENT OFFICE.

MAURICE VERGNES, OF NEW YORK, N. Y.

IMPROVEMENT IN THE CONSTRUCTION OF VOLTAIC GAS-BATTERIES.

Specification forming part of Letters Patent No. 28,317, dated May 15, 1860.

*To all whom it may concern:*

Be it known that I, MAURICE VERGNES, of the city and State of New York, have invented a new and useful Improvement in the Construction of Galvanic Batteries; and I do hereby declare that the following is a full, clear, and exact description thereof, and of its construction and mode or manner of operation, reference being had to the accompanying drawings, and to the letters of reference marked thereon, making a part of this specification.

My invention is an improvement on the Bunsen and Grove galvanic batteries; and it consists of a novel arrangement of the parts and a new mode of building up or composing the battery, so as to secure the following objects: first, to introduce the atmospheric air, oxygen, ozone, or any other gas for the production of electricity; second, to produce a much larger amount of electricity with a smaller expense of acid.

Figure 1 is a general view of a galvanic battery constructed according to my invention. Fig. 2 is a perpendicular section of one complete galvanic cell. Fig. 3 is a representation of the exterior of the inner cell of the battery, as hereinafter described. Fig. 4 is a representation of the device used for connecting several cells.

The battery has three cells, and unlike all other galvanic batteries has three decomposing and three decomposable elements. The outer cell, A B C D, is of zinc, and to this is connected a copper conductor, N, to conduct the negative electricity. This zinc cell or vase should be cleaned from time to time, and its interior surface slightly amalgamized, and its exterior surface may be coated or surrounded with some impermeable material, so as to insure their longer duration. Within this cell or vase of zinc is the porous-cell E F G H, which is fitted with a rim, *a a*, at its extremities to prevent the shaking or striking of this cell against the inclosing zinc cell. Such porous cup is similar to those used in ordinary batteries. Within this porous cell or vase is another cylindrical vase, I K L M, made of china, glass, or any material capable of resisting the action of nitric acid, which is open at its lower end, and the top of which can be closed by a cock or faucet, Z, through which and the top of the vase runs a small hole, *o*, for the introduction of the gaseous substances into the interior of the vase I K L M. When the cock or faucet Z is turned so as to have its flattened end perpendicular the passage *o* is open; but when turned horizontal the vase is perfectly air-tight. The interior of this cylinder I K L M is filled with pieces of porous coke platinized by the Knoltz and Elkington process. These pieces of coke retain in their cavities the atmospheric air, oxygen, ozone, or any other gaseous substances which may be introduced. A platinum wire, P', runs from the interior of such vase to the exterior and conducts the positive electricity to the knob or points P. On the outside of such cylinder I K L M, as shown in Fig. 3, are several ribbons of platinum, Y Y Y, touching with their lower extremities the porous coke in the interior, and connected together by a platinum wire, S, which also embraces the conductor P, and which thus conveys the whole of the electricity to the point P.

The small space between the porous-cup E F G H and the inner case, I K L M, is filled with small granulated pieces of porous coke.

When the battery is to be used the zinc vase or cylinder is filled with water slightly acidulated with sulphuric acid. The faucet or cock Z is then turned, in order to introduce in the cylinder the atmospheric air, oxygen, or any other suitable gaseous substance. The faucet is then closed, and the space between the two cylinders E F G H and I K L M is filled with pure nitric acid. By reason of the small space between such cylinders and the pressure of the gas or air in the interior cylinder the acid is prevented from entering the interior of such cylinder; but the vapor arising from the nitric acid enters such cylinder and gives a remarkable degree of conductibility to the gas, &c., introduced into the cylinder. The gradual increase of the pressure of the gases in the cylinder from the decomposition of the nitric acid will cause the nitric acid to rise at X; but the equilibrium may be restored by turning the faucet Z for an instant.

When several cells are employed for a compound battery I place under the bottom of them a glazed or vitrified plate to prevent the communication between the different cells. Such cells are to be connected together at their top by a device or arrangement shown in Fig. 4, which is of brass and gilded.

When the battery is to be unloaded the faucet Z is opened, so as to let the nitrogen escape. At the same time the acid will rise in the interior cylinder from the space X. The two inner cylinders should then be lifted from the zinc cup, and may be placed in any convenient earthen vessel to receive the acid that may drip from the porous cup E F G H. As the vapor or fumes of the nitric acid rise into the inner cylinder there is no unpleasant smell or odor produced by the use of my battery, as is the case with other batteries.

When the battery is to be used on shipboard the cells should be suspended severally, as marine compasses are hung, by concentric rings which have glass or china supporters. The quantity of acid required decreases every day, and thus the expense of the battery becomes very trifling.

I do not claim, generally, the use of platinized coke, as this has been used in other batteries; but

What I claim as my invention, and desire to secure by Letters Patent in the construction of voltaic batteries, is—

1. The use, in gas-batteries or combined acid and gas batteries, of porous platinized coke, substantially as and for the purposes set forth.

2. The general arrangement of the whole battery or apparatus, substantially as described.

M. VERGNES.

Witnesses:
S. D. LAW,
HOWARD BIRD.